UNITED STATES PATENT OFFICE 2,489,237

3,4-(2'-KETO-IMIDAZOLIDO)-2-ω-HYDROXY-PENTYL-THIOPHANES

Moses Wolf Goldberg, Upper Montclair, and Leo Henryk Sternbach, Montclair, N. J., assignors to Hoffmann-La Roche Inc., Roche Park, Nutley, N. J., a corporation of New Jersey No Drawing. Application June 8, 1948, Serial No. 31,845

14 Claims. (Cl. 260—309)

The present invention relates to the synthesis of 3,4-(2' - keto - imidazolido) - 2 - (ω - hydroxypentyl)-thiophanes, which can be represented by the following formula:

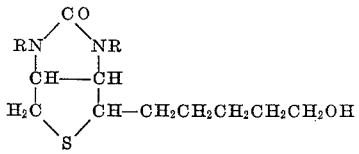

wherein R stands for H or a benzyl radical.

In one of its more specific and preferred aspects, the invention relates to the production of 3,4-(2'-keto - imidazolido)-2-(ω-hydroxypentyl)-thiophane, which can be represented by the following formula:

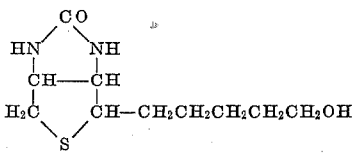

We have designated this compound as biotinol. In the first mentioned formula, where both R's are benzyl, we have designated the compound as dibenzyl-biotinol, and where one R is benzyl and the other hydrogen, as N-monobenzyl-biotinol.

The compounds can be prepared in their optically active and inactive forms, such as for example, the d-, l-, and d,l- forms of biotinol, monobenzyl-biotinol, and dibenzyl-biotinol.

d-Biotinol when tested in vitro, with Saccharomyces cerevisiae and Lactobacillus arabinosus shows practically no biotin activity. However, when injected intramuscularly in humans or animals, d-biotinol is converted into d-biotin, which is excreted in the urine as shown by the test with Lactobacillus arabinosus. The biotin amount excreted after parenteral administration of d-biotinol is approximately equal to the amount found after the injection of an equivalent amount of d-biotin.

The results obtained on oral administration of d-biotinol are surprising. In these experiments, a considerably higher precentage of d-biotin is found in the urine than after feeding of d-biotin itself. This difference is particularly striking after oral administration of large doses. For example, in rats only 27 per cent of 10 mg. of d-biotin are found in the urine, while 75 per cent of the equivalent amount of d-biotinol (9.4 mg.) is excreted as d-biotin. The difference is not so great with smaller doses, although amounts of 5γ still give figures of 44 per cent and 74 per cent, respectively.

These observations lead to two conclusions: (1) d-biotinol is almost quantitatively oxidized in the organism to d-biotin, (2) d-biotinol is more easily absorbed from the intestinal tract than d-biotin as indicated by the feeding experiments, and therefore can be utilized by this route as well as by parenteral administration.

This, and the considerably higher solubility of d-biotinol in water and in organic solvents as compared to d-biotin, point to considerable practical advantages in the use of biotinol over biotin.

According to our invention, compounds as represented by the first formula above set forth can in general be prepared by reducing a 3,4-(2'-keto-imidazolido)-2-(ω-substituted-butyl) - thiophane of the following formula:

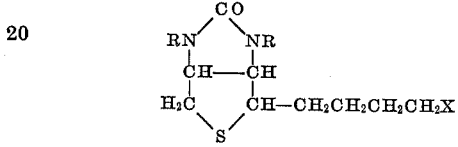

wherein R is a member of the group consisting of hydrogen and benzyl, and X represents a radical which is convertible to —CH₂OH by reduction, as for example, a carboxy, lower carbalkoxy, and carbonyl halide (CO-halogen) radical. Any appropriate reducing agents may be employed for this purpose, for example, lithium aluminum hydride.

According to a more particular aspect of our invention, biotinol can be prepared by (A) reducing an alkyl ester such as the ethyl ester of monobenzyl-biotinol (IV) with sodium in ethyl alcohol, or by (B) reducing monobenzyl-biotin (II) or (C) its acid chloride (III) with lithium aluminum hydride. By methods (B) and (C) the reduction is achieved with practically quantitative yields. The monobenzyl-biotinol (VI) obtained in each of reactions (A), (B) and (C) is then debenzylated, as for example, with sodium in liquid ammonia to yield biotinol. By starting with the optically inactive intermediates, d,l-biotinol is obtained by the above series of reactions; by using the optically active isomers as starting materials, d- and l-biotinol are formed.

d-Biotinol can also be obtained by reducing first the carboxyl group in l-dibenzyl-biotin (I) with lithium aluminum hydride, and then stepwise, debenzylating the crude dibenzyl-biotinol (V) thus obtained (V→VI→VII). When starting from d-dibenzyl-biotin, l-monobenzyl-biotinol and l-biotinol can be obtained.

In another procedure, biotinol in both its optically active or inactive forms (VII) can be directly prepared from biotin and its alkyl esters such as the methylester (VIII) by reduction with lithium aluminum hydride. This is the preferred procedure since it results in highest yields. Thus, starting from d-biotin or d-biotin methyl ester, d-biotinol is obtained in excellent yield.

The following scheme illustrates the reactions involved in the above-mentioned synthesis of d-biotinol and the benzyl derivatives thereof. In the formulae, R=benzyl.

EXAMPLE 2 d,l-Monobenzyl-biotinol (VI)

(A) Two grams of sodium are introduced within a few minutes into a boiling solution of 1 gram of the ethylester of d,l-monobenzyl-biotin in 40 cc. of absolute ethyl alcohol. The mixture is refluxed until the sodium is completely dissolved. Forty cc. of water are then added, the solution is concentrated and the alcohol is removed by distillation under atmospheric pressure. The residual alkaline mixture is kept at +5° for 20 hours

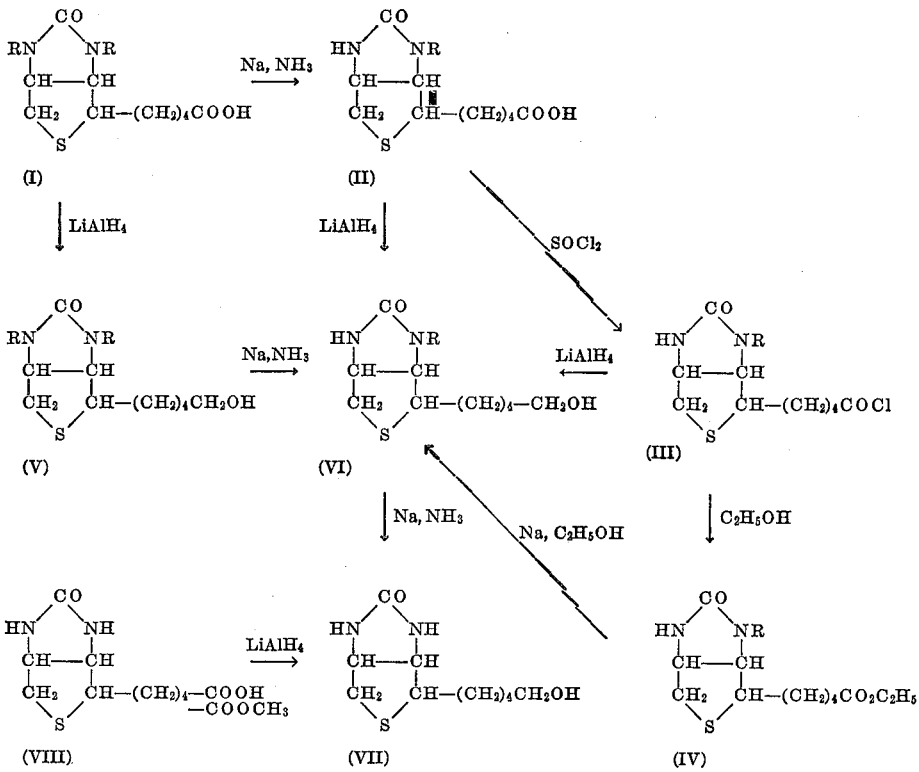

The following examples will serve to illustrate the invention:

EXAMPLE 1 d,l-Monobenzyl-biotin acid chloride and ethyl ester (III) and (IV)

Twenty cc. of thionyl chloride are added at room temperature to a suspension of 20 grams of d,l-monobenzyl-biotin in 400 cc. of dry benzene. The mixture is stirred until all the monobenzyl-biotin has dissolved, and is then kept for 20 minutes at 35–40° C. The mixture is concentrated in vacuo, and petrol-ether is added to the crystalline mass. The reaction product precipitates in fine needles and is filtered off. The mother liquors are concentrated to dryness, the residue is dissolved in benzene, and the acid chloride is again precipitated with petrol-ether. The product can be recrystallized from a mixture of benzene and petrol-ether, forming long needles melting at 122–123° C.

The ethyl ester is obtained by refluxing one gram of the above crude acid chloride for five minutes with 10 cc. of ethyl alcohol. The mixture is then concentrated in vacuo and the residue is recrystallized from ethyl alcohol, forming needles melting at 163–164° C.

and the precipitate filtered off. The reaction product is purified by recrystallization from a mixture of methanol and ether, or methanol and water, forming needles melting at 162–163° C.

(B) A solution of one gram of d,l-monobenzyl-biotin acid chloride in 50 cc. dry dioxane is added within 5–10 minutes to a stirred solution of approximately 0.2 gram of lithium aluminum hydride in 80 cc. of ether. A voluminous precipitate is formed. The mixture is stirred for another ½ hour, and is then concentrated in vacuo. The residue is decomposed with water, the mixture is acidified with hydrochloric acid, cooled and filtered.

The precipitate is dissolved in methanol and reprecipitated in the form of fine needles by the addition of dilute alkali. The product, thus freed from unreacted monobenzyl-biotin, is recrystallized from a mixture of methanol and ether, or methanol and water. It is identical with the d,l-monobenzyl-biotinol prepared by procedure A.

(C) A warm solution of 2 grams of d,l-monobenzyl-biotin in 100 cc. of dioxane is added to a stirred solution of 0.4 gram of lithium aluminum hydride in 50 cc. of dry ether. The reaction mixture is treated as in B. The yield of d,l-monobenzyl-biotinol is around 90 per cent.

EXAMPLE 3 d,l-Biotinol (VII)

Sodium (0.44 gram) is added in small portions to a stirred solution of 4.8 grams of d,l-monobenzyl-biotinol in 300–400 cc. of liquid ammonia. The mixture is stirred for 20 minutes and then any unreacted sodium is destroyed with ammonium chloride. The liquid ammonia is evaporated, the residue is treated with 200–500 cc. of water and acidified with hydrochloric acid. Unreacted starting material is extracted with chloroform, and the aqueous solution containing the reaction product is concentrated in vacuo to a small volume. The d,l-biotinol precipitates in fine needles. It is recrystallized from a mixture of methanol and ether and forms long needles melting at 160–161° C.

EXAMPLE 4 d-Monobenzyl-biotinol (VI)

(a) A solution of 2 grams of d-monobenzyl-biotin in 100 cc. of dioxane is reduced in the same way as described under Example 2(C) for the racemic product. The reaction product is recrystallized from a mixture of acetone and ether, forming plates, crystallizing in rosettes, and melting at 105–106° C. The compound has a specific rotation $[\alpha]_D^{25}$ of $+100.7°$ ($\pm 1°$) in 1.5 per cent solution in methanol.

By employing l-monobenzyl-biotin in the same manner, l-monobenzyl-biotinol can be obtained.

(b) A solution of 27 grams of l-dibenzyl-biotin in 150 cc. of ethylene glycol diethylether is added dropwise within five minutes to a stirred solution containing a large excess of lithium aluminum hydride (5 grams) in 250 cc. of ether. The mixture is heated for another 30 minutes in a water bath, and is then decomposed with ice and hydrochloric acid. The reaction product is extracted with ethyl acetate, the ethyl acetate solution is extracted with alkali, then dried and concentrated in vacuo. 19 grams of a slightly yellowish neutral oil are thus obtained. The debenzylation of this crude dibenzyl-biotinol is carried out as follows: The product (18 grams) is dissolved in 350 cc. of xylene and introduced into 1300 cc. of liquid ammonia. Sodium (2.82 grams) is added to this mixture in small portions, and the mixture stirred for 30 minutes. Unreacted sodium is destroyed with ammonium chloride, the ammonia is evaporated and dilute hydrochloric acid is added to the residue. The xylene layer is separated and the aqueous solution is extracted several times with ethyl acetate. The organic layers are combined, dried with sodium sulfate and concentrated in vacuo.

The residual oil weighs 15 grams. In order to isolate the crystalline d-monobenzyl-biotinol, the crude product is chromatographically purified by dissolving the oil in 100 cc. of benzene and passing the solution through a column of 100 grams of activated alumina. An additional 800 cc. of benzene are then passed through the column, the percolates being collected in portions of 100–200 cc. The first fractions contain 4 grams of an oily by-product, further fractions contain some d-monobenzyl-biotinol. Ethyl acetate and then a mixture of 80 per cent acetone and 20 per cent alcohol are passed through the column, to elute the d-monobenzyl-biotinol. These eluates solidify after the evaporation of the solvent.

The d-monobenzyl-biotinol can be recrystallized from a mixture of acetone and ether. It is identical in every respect with the product obtained in better yield by the simpler method described under (a).

By employing d-dibenzyl biotin in the same manner, l-monobenzyl biotinol can be obtained.

EXAMPLE 5 d-Biotinol (VII)

Sodium (0.44 gram) is added in small portions to a stirred solution of 4.8 grams of d-monobenzyl-biotinol in 300–400 cc. of liquid ammonia. The solution is stirred for 20 minutes. Unreacted sodium is then destroyed with ammonium chloride and the liquid ammonia is evaporated. The residue is treated with 200–500 cc. of water and acidified with hydrochloric acid. Unreacted starting material is extracted with chloroform, and the aqueous solution containing the reaction product is concentrated in vacuo. The d-biotinol precipitates in fine needles. It is recrystallized from methanol, or a mixture of methanol and ether, and forms long needles melting at 174.5–175.5° C. The specific optical rotation was determined in 1 per cent methanol solution: $[\alpha]_D^{25} = +84.7°$ ($\pm 1°$).

By employing l-monobenzyl-biotin in the same manner, l-biotinol can be obtained.

EXAMPLE 6 d-Biotinol from d-biotin

A solution of 1 gram of d-biotin in 20 cc. of dry pyridine is added dropwise to 100 cc. of an ether solution containing 0.5 gram of lithium aluminum hydride. The mixture is stirred at room temperature for ½ hour and refluxed for another ½ hour. The excess lithium aluminum hydride is decomposed with water, and the ether and pyridine are removed by steam distillation. The mixture is then concentrated to a small volume, made alkaline with sodium hydroxide and exhaustively extracted with ether. The ether solution is concentrated and the residue is recrystallized from a mixture of methanol and ether. It forms needles melting at 174.5–175.5° C. and is in every respect identical with d-biotinol prepared by other methods described herein.

EXAMPLE 7 d-Biotinol from d-biotin methyl ester (i) A solution of 1 gram of d-biotin methyl ester in 100 cc. of dry dioxane is introduced into a stirred solution of 0.25 gram of lithium aluminum hydride in 60 cc. of dry ether. The mixture is stirred at room temperature for ½ hour, then refluxed for another ½ hour. Water and a small amount of alkali are added, the ether is distilled off, and the residual mixture is refluxed for a few minutes to saponify the unreacted methyl ester. Then the dioxane and water are distilled off, the residue is dissolved in a small amount of water, and the turbid alkaline solution is exhaustively extracted with ether. The ether solution, containing a crystalline precipitate, is concentrated and the residue is recrystallized from a mixture of methanol and ether. The product is in every respect identical with the d-biotinol prepared by other methods described herein.

Following the procedures of Examples 6 and 7, but employing l-biotin and its methylester, l-biotinol can be obtained.

(ii) The reduction of d-biotin methylester can also be carried out in a Soxhlet type extraction apparatus. For this purpose, the starting material (2.58 grams) is placed in the thimble of the extraction apparatus over a solution of 0.6 gram lithium aluminum hydride in 100 cc. dry tetrahydrofuran, and the solution refluxed for 2-5 hours. When the d-biotin methylester has been completely extracted into the lithium aluminum hydride solution, the excess of the reducing agent is decomposed with methanol and the mixture concentrated in vacuo. Some water is then added, and the mixture heated for one hour to 90° C. in order to saponify small amounts of unreacted d-biotin methylester which might be present. The turbid solution is then exhaustively extracted with chloroform, and the chloroform solution containing the reaction product concentrated in vacuo. The product thus obtained is practically pure d-biotinol. It can be further purified by crystallization from methanol.

The reduction of d-biotin methylester can also be carried out in a similar way using solutions of lithium aluminum hydride in dry dioxolane, ethylene glycol dimethyl ether, ethylene glycol diethyl ether, and similar solvents. Instead of the d-biotin methylester, other d-biotin esters can be employed, for example, the ethyl ester.

The monobenzyl biotin and dibenzyl-biotin employed as starting materials, can be prepared in the manner described in our applications, Serial No. 673,642, filed May 31, 1946, and Serial No. 763,446, filed July 24, 1947. The following will serve to illustrate the preparation of these starting materials.

*1,3-dibenzyl-imidazolidone-(2)-cis-4,5-dicarboxylic acid and its anhydride*

To a stirred, ice cooled solution of 648 grams (1.98 moles) of bis-benzylaminosuccinic acid in 2 liters 3 N potassium hydroxide, are added in small portions (within 1½ hours) 1.6 liters of a 3.75 molar solution of phosgene in xylene (=6 moles COCl₂) and 2.7 liters 6 N potassium hydroxide (=14 moles). The mixture is then acidified with concentrated hydrochloric acid, and the formed precipitate filtered off and washed with water. The precipitate is then washed thoroughly with hot alcohol, and the aqueous filtrate is extracted several times with ethyl acetate. The alcoholic solution and the ethyl acetate extract contain all the imidazolidone-dicarboxylic acid formed. The alcohol insoluble part of the precipitate is pure starting material (220 grams= 0.65 moles). The alcoholic and ethyl acetate solutions are taken to dryness, and the residue is refluxed with benzene until it becomes completely crystalline. The cooled mixture is filtered; the main part of the dibenzyl-imidazolidone-dicarboxylic acid remains on the funnel (283 grams= 0.8 moles). It can be recrystallized from ethyl acetate. Prisms, melting first at 167° C., then resolidifying again and melting at 236° C.

The benzene mother liquor is concentrated in vacuo, and the rest of the reaction product is isolated in form of its anhydride in the following way: The oily residue is refluxed with acetic anhydride, then the mixture is concentrated and benzene is added. The anhydride formed crystallizes in nice needles. Melting point 236-237° C.

*Acetate of the cyclic form of 1,3-dibenzyl-cis-4-carboxy-5-formyl-imidazolidone-2, 3,4-(1',3'-dibenzyl-2'-keto-imidazolido)-2-keto - 5 - acetoxy-tetrahydrofuran*

A mixture of 100 grams of the anhydride of 1,3-dibenzyl-imidazolidone-cis-4,5-dicarboxylic acid, 150 grams zinc dust, 100 grams zinc powder (40 mesh), 1500 cc. acetic anhydride and 500 cc. acetic acid is stirred and refluxed for 10-15 hours. The dicarboxylic acid can be used instead of the anhydride. In that case, the acid is first mixed with the acetic anhydride, refluxed for 10 minutes and then the other constituents are added. The amounts of acetic acid and anhydride can be reduced to about ½ without affecting the yield. If too little is used, the yield is reduced. After that time, the mixture is cooled, filtered and the precipitate on the funnel washed with ethyl acetate. The filtrate is concentrated in vacuo, and the oily or partly crystalline residue is treated with ice water and ethyl acetate, until all the organic substance is dissolved. The ethyl acetate layer is washed with water, dried with sodium sulfate and concentrated in vacuo. The oily or partly crystalline residue is boiled up with acetic anhydride, in order to reconvert any of the compound decomposed during the treatment with water into the cyclic acetate. The mixture is again concentrated in vacuo. Xylene is then added to the residue, and part of its is distilled off in vacuo, then ether and petrol-ether are added. The reaction product separates in fine needles or prisms, which melt at 103-104° C. After drying, the melting point is 124-125° C.

*1,3-dibenzyl-cis-4-carboxy-5-formyl-imidazolidone-2*

An excess of 3 N sodium hydroxide solution is added to a solution of the acetate of the cyclic form of 1,3-dibenzyl-cis-4-carboxy-5-formyl-imidazolidone-2 in dioxane. After two minutes the mixture is acidified with dilute sulfuric acid and extracted with ether. The ether extract is washed, dried with sodium sulfate, and concentrated in vacuo. The residue is recrystallized from a mixture of acetone, ether and petrol-ether.

The free aldehydo acid crystallizes in colorless needles or prisms melting at 109-110° C. It forms a 2,4-dinitrophenylhydrazone, which crystallizes from a mixture of dioxane, benzene and petrol-ether in orange prisms melting at 223.5-224.5° C.

The free aldehydo acid can be reconverted into the acetate of the cyclic form by treating it with acetic anhydride or acetyl chloride.

*Thiolactone of 1,3-dibenzyl-cis-4-carboxy-5-mercaptomethyl-imidazolidone-2, 3,4-(1',3'-dibenzyl-2'-keto-imidazolido)-2-keto-thiophane*

A. A vigorous stream of hydrogen chloride and hydrogen sulfide is passed through a suspension of 150 grams of the acetate of the cyclic form of 1,3-dibenzyl-cis-4-carboxy - 5 - formyl-imidazolidone-2 in 850 cc. absolute alcohol cooled to —10 to —20° C. After about 1½ hours, most of the starting material is dissolved. To complete the reaction, hydrogen chloride and hydrogen sulfide are passed through the solution for another hour. The solution is then concentrated in vacuo, at the lowest possible temperature and with exclusion of moisture. Some toluene is added to the residue and distilled off in vacuo, thus removing most of the hydrogen chloride still present.

B. A vigorous stream of hydrogen chloride and hydrogen sulfide is passed through a solution of 150 grams 1,3-dibenzyl-cis-4-carboxy-5-formyl-imidazolidone-2 in 850 cc. absolute alcohol cooled to —10 to —20° C. After 2½ hours, the solution is concentrated in vacuo at the lowest possible temperature and with exclusion of moisture. Some toluene is added to the residue and distilled off in vacuo, thus removing most of the hydrogen chloride still present.

C. The residual oil from reaction A or reaction B is dissolved in 1200 cc. of a suspension of potassium hydrosulfide in alcohol. (This suspension is prepared by saturating a mixture of 672 grams potassium hydroxide and 4 liters of alcohol with hydrogen sulfide.) The mixture is left at room temperature for 15 hours, then refluxed for one hour, poured on ice and acidified with dilute sulfuric acid. The organic part is extracted with ether, the solution is dried with sodium sulfate and concentrated in vacuo. The residue is reduced in a stirred refluxing mixture of 900 grams zinc dust, 150 grams granulated zinc (20 mesh) and 2.3 liters acetic acid. After 4 hours, the solution is filtered, and the mixture of zinc and zinc acetate remaining on the funnel is washed with ether and water. The filtrate is concentrated in vacuo and diluted with ether and 40 per cent sulfuric acid until clear separation takes place. The ether layer is separated, washed with water and concentrated in vacuo to a small volume. After 24–48 hours, the mixture becomes crystalline. It is then diluted with some more ether and filtered. Melting point 123–124° C.

The thiolactone can be recrystallized from a mixture of acetone, ether and petrol-ether. The pure compound forms colorless plates melting at 126–127° C. It is soluble in strong alkali, and gives a positive mercaptan test with sodium nitroprusside.

*3,4-(1',3'-dibenzyl-2'-keto-imidazolido)-2-hydroxy-2-(ω-ethoxypropyl)-thiophane*

A Grignard solution, prepared from 13.6 cc. of 3-ethoxypropyl-bromide and an excess of magnesium (4.8 grams) in 30 cc. of ether and 10 cc. of benzene, is diluted with benzene, decanted from the unreacted magnesium and added dropwise (in about 30 minutes) to a boiling, stirred solution of 27 grams of 3,4-(1',3'-dibenzyl-2'-keto-imidazolido)-2-keto-thiophane (thiolactone) in 350 cc. of benzene. The solution is refluxed for another 3½ hours. The mixture is then decomposed with ice and dilute sulfuric acid, the organic layer is separated and concentrated in vacuo. The residue is dissolved in methanol and heated to 50° C. with an excess of aqueous sodium hydroxide solution. Ether and water are added, and the two layers are separated. The alkaline aqueous solution contains the unreacted thiolactone, which is extracted and recovered after acidification. The ether layer, containing the reaction product, is dried and concentrated in vacuo. The residue is crystallized from ether, petrol-ether.

The product is soluble in strong alkali and gives a positive mercaptan test with sodium nitroprusside. It can be recrystallized from a mixture of acetone, ether and petrol-ether. Prisms melting at 114.5–115.5° C. are obtained.

*3,4-(1',3'-dibenzyl-2'-keto-imidazolido)-2-(ω-ethoxy-propylidene)-thiophane*

A solution of 20.0 grams of 3,4-(1',3'-dibenzyl-2'-keto-imidazolido)-2-hydroxy-(ω-ethoxypropyl)-thiophane in 100 cc. acetic acid is refluxed for 1½ hours. The solution is concentrated in vacuo, the residue is dissolved in ether and the solution is washed with dilute sodium carbonate solution. The ether solution is dried and concentrated in vacuo. The oily residue solidifies after a few hours. It can be recrystallized from petrol-ether and forms fine needles melting at 62.5–63.5° C.

*3,4-(1',3'-dibenzyl-2'-keto-imidazolido)-2-(ω-ethoxypropyl)-thiophane*

The crude 3,4-(1',3'-dibenzyl-2'-keto-imidazolido)-2-(ω-ethoxy-propylidene)-thiophane (19 grams), obtained as described above, is dissolved in 150 cc. of methanol and hydrogenated in the presence of 4 grams of prehydrogenated palladium oxide at room temperature and atmospheric pressure. The calculated amount of hydrogen is taken up in about 30 hours. The catalyst is then filtered off, and the solution is concentrated in vacuo. The product solidifies after some time and is used in the crude form for the next step.

*3,4-(1',3'-dibenzyl-2'-keto-imidazolido)-1,2-trimethylene-thiophanium bromide*

A solution of 5 grams of 3,4-(1',3'-dibenzyl-2'-keto-imidazolido)-2-(ω-ethoxypropyl)-thiophane in 50 cc. of an 18 per cent solution of hydrogen bromide in acetic acid is heated for three hours to 60° C. The solution is concentrated in vacuo, and treated with water and benzene. The mixture is cooled to +5° C. and the precipitated crystalline reaction product is filtered off and washed with benzene and cold water. A further amount of the product can be obtained by concentrating the aqueous part of the mother liquors (the benzene layer contains only impurities). The product can be recrystallized from water. Thick plates melting at 220–222° C. are obtained.

*3,4-(1',3'-dibenzyl-2'-keto-imidazolido)-2-ω,ω-dicarboxy-butyl)-thiophane or (d,l-delta-carboxy-dibenzyl-biotin)*

13.2 grams of dried 3,4-(1',3'-dibenzyl-2'-keto-imidazolido)-1,2-trimethylene-thiophanium bromide are added with stirring to a solution of 1.38 grams of sodium in 300 cc. freshly distilled diethyl malonate. The reaction mixture is stirred at 140–150° C. for two hours. It is then cooled, and ethyl acetate and water are added, whereupon the precipitated sodium bromide dissolves. The organic and aqueous layers are separated, and the latter is extracted twice more with ethyl acetate. After drying the combined organic extracts with sodium sulfate, the solvents are distilled off in vacuo, first using a steam bath and then an oil bath at about 100° C. The oily orange colored residue, containing the diethyl ester of d,l-delta-carboxy-dibenzyl-biotin, is refluxed for 8–10 hours with 250 cc. of methanol, 80 cc. of water and 120 cc. of 50 per cent potassium hydroxide. The reaction mixture is concentrated in vacuo to about ⅛ of its original volume, and then about 1500 cc. of water are added. A slight precipitate is formed, which is extracted with ethyl acetate. This is a neutral by-product. The aqueous solution is acidified with hydrochloric acid, whereupon an oil precipitates which is extracted with ethyl acetate. After drying over sodium sulfate and distilling the solvent off in vacuo, a solid residue is obtained. This is d,l-delta-carboxy-dibenzyl-biotin. It can be recrystallized from a mixture of acetone, ether and petrol-ether, and melts then at 133–135° C. with decomposition (evolution of carbon dioxide).

*Decarboxylation of d,l-delta-carboxy-dibenzyl-biotin to d,l-dibenzyl-biotin*

12 grams of d,l-delta-carboxy-dibenzyl-biotin are refluxed for 10 minutes in 100 cc. of o-dichlorobenzene. The solvent is steam distilled and the brown residue extracted with ethyl acetate. The ethyl acetate solution is dried and concentrated in vacuo. The oily residue, weighing about 11.8 grams is dissolved in boiling benzene, the solution is treated with charcoal, and filtered. Ether and petrol-ether are then added to the filtrate. After standing for at least 24 hours, d,l-dibenzyl-biotin crystallizes out. The product, which is somewhat colored, is filtered off and washed with ether on the suction funnel, until the filtrate is colorless. M. P. 109–112° C. After several crystallizations from a mixture of acetone, ether and petrol-ether, the melting point is constant at 122–124° C.

*Debenzylation of d,l-dibenzyl-biotin to d,l-monobenzyl-biotin*

4.3 grams of crystalline d,l-dibenzyl-biotin are dissolved in 125 cc. of warm dry xylene, and placed in a 3-neck flask fitted with a mechanical stirrer and gas inlet and outlet tubes. An acetone-Dry Ice bath is provided. The solution is stirred and about 250 cc. of dry liquid ammonia are introduced. The acetone bath is removed and 1.15 grams of sodium are added in small portions during the course of five minutes. The blue color of the solution remains even when it is stirred for another half hour. Ammonium chloride is added to destroy the excess of sodium. After distilling off the ammonia, and adding water and ether, the reaction mixture is acidified to pH 1 with hydrochloric acid and cooled to about 5° C. The crystalline precipitate is filtered off. It melts at 165–172° C. Further purification is obtained by recrystallization from about 2 liters of boiling water. On standing, the product crystallizes out. It melts now at 175–176° C. and shows no melting point depression when mixed with a known sample of pure d,l-monobenzyl-biotin. The aqueous filtrate is extracted three times with chloroform, and the chloroform, after drying, is concentrated in vacuo. The residue consists likewise of d,l-monobenzyl-biotin.

*l-3,4-(1',3'-dibenzyl-2'-keto-imidazolido)-1,2-trimethylene-thiophanium d-camphorsulfonate or (l-thiophanium d-camphorsulfonate)*

36 grams of silver carbonate are treated with a solution of 58.1 grams of d-camphorsulfonic acid in 350 cc. distilled water. The solution of silver d-camphorsulfonate thus obtained is decanted from a small amount of undissolved silver carbonate, and is then added to a boiling solution of 111.4 grams of 3,4-(1',3'-dibenzyl-2'-keto-imidazolido)-1,2-trimethylene-thiophanium bromide in 3 liters of distilled water. The precipitated silver-bromide is filtered off, the solution is concentrated in vacuo to dryness, and the dry residue is dissolved in 2100 cc. of boiling isopropanol. After standing at room temperature for 24 hours, the crystalline voluminous precipitate formed is filtered off. The yield is 61.2 grams=82 per cent of a product having a specific optical rotation $[\alpha]_D^{25}$ of $-1.7\pm0.2°$. The material can be further purified by recrystallization from isopropanol. Needles melting at about 238–239° C. are obtained. The specific optical rotation of the pure material is $[\alpha]_D^{25}=-2.6°$. The dextro-rotatory antipode is contained in the mother liquids.

A mixture of absolute alcohol and ether can also be employed for the separation of the l- and d-isomers. Thus 9.3 grams of the crude mixture of the d-camphorsulfonates is dissolved in 50 cc. of absolute alcohol. 70 cc. of ether are added, and the precipitated crystals are filtered after one hour. The material thus obtained is, however, slightly less pure; $[\alpha]_D^{25}=-0.4°$.

*l-3,4-(1',3'-dibenzyl-2'-keto-imidazolido)-2-(ω,ω-dicarboxy-butyl)-thiophane*

43.5 grams of l-3,4-(1',3'-dibenzyl-2'-keto-imidazolido)-1,2 - trimethylene-thiophanium d-camphorsulfonate ($[\alpha]_D^{25}=-1.0°$ to $-2.6°$) and 60 cc. of toluene are added to a stirred warm (70° C.) solution of 5.05 grams of sodium in 80 grams of diethyl malonate. The mixture is refluxed for three hours, it is then cooled to room temperature, diluted with ether and washed with ice water to remove some dark impurities. The organic solution is concentrated in vacuo, and the oily residue is dissolved in 200 cc. of methanol. 300 cc. of a 50 per cent aqueous potassium hydroxide solution are added and the mixture is refluxed for five hours. The cooled solution is then diluted with water, acidified with concentrated hydrochloric acid and extracted with ethyl acetate. The ethyl acetate extract is concentrated in vacuo, and the crude oily reaction product is used for the next step. The product can be recrystallized from a mixture of acetone, ether and petrol-ether and forms prisms melting at 133–137° C. with decomposition.

$$[\alpha]_D^{25}=-4.4°$$

(c=1.2 per cent in 0.1 N sodium hydroxide.)

*l-3,4-(1',3'-dibenzyl - 2'-keto-imidazolido) - 2-(ω-carboxybutyl)-thiophane or l-dibenzyl-biotin*

600 cc. of xylene are added to the crude oily l-3,4-(1',3' - dibenzyl-2' - keto - imidazolido)-2-(ω,ω-dicarboxy-butyl)-thiophane (33–34 grams) obtained as described above. The mixture is refluxed until the initially undissolved product is completely decarboxylated, and the dibenzyl-biotin formed is completely dissolved (10–20 minutes). The solution is then heated for another 20 minutes, during which time about 200 cc. of the solvent is distilled off. The rest of the solvent is removed by vacuum distillation. The oily residue, representing crude dibenzyl-biotin, is used for the next step without further purification. It is very difficult to crystallize. The crude material has a negative specific rotation.

*d-Monobenzyl-biotin*

About 5 grams of crude oily l-dibenzyl-biotin are dissolved in 30 cc. dry ethylene glycol diethyl ether (purified by fractionation, followed by refluxing over sodium for five hours and distilling onto fresh sodium). This solution is introduced rapidly with stirring into 100 cc. of liquid ammonia cooled in a dry ice bath. To the clear or slightly turbid solution are added in portions about 0.8 gram of sodium. The addition of sodium is stopped, even before the whole amount has been introduced, if a persistent blue color appears. This might be the case after the addition of as little as 0.62 gram. A slight excess of sodium (blue color), if present, is destroyed with some ammonium chloride. The ammonia is then evaporated, and water and hydrochloric acid are added to the residue. The mixture is cooled and the precipitated d-monobenzyl-biotin is filtered off. After recrystallization from dioxane, the compound forms prisms melting at 181–182° C., and showing a specific rotation $[\alpha]_D^{25}$ of $+108.1°\pm1°$. (1 per cent solution in 0.1 N sodium hydroxide.)

d-3,4-(1′,3′-dibenzyl-2′-keto-imidazolido)-1,2-trimethylene-thiophanium d-camphorsulfonate or (d-thiophanium d-camphorsulfonate)

The mother liquors obtained after separation of the l-thiophanium d-camphorsulfonate, described above are concentrated in vacuo, and the residue is dissolved in the smallest possible amount of ethanol. Petrol-ether is added to this solution, causing the precipitation of the crystalline d-thiophanium d-camphorsulfonate.

This compound is purified by recrystallization from a mixture of ethanol and petrol-ether. Needles or prisms melting at 231–232° C. are obtained. The specific optical rotation $[\alpha]_D^{25}$ of this compound is $+18.8°$.

d-3,4-(1′,3′-dibenzyl-2′-keto-imidazolido)-2-(ω,ω-dicarboxy-butyl)-thiophane 43.5 grams of d-3,4-(1′,3′-dibenzyl-2′-keto-imidazolido)-1,2-trimethylene-thiophanium d-camphorsulfonate ($[\alpha]_D^{25}=+18.8°$) and 60 cc. of toluene are added to a stirred warm (70° C.) solution of 5.05 grams of sodium in 80 grams of diethyl malonate. The mixture is refluxed for 3 hours, then cooled to room temperature, diluted with ether and the ether solution washed with ice water, thus removing some dark impurities. The organic solution is concentrated in vacuo, and the oily residue is dissolved in 200 cc. of methanol. 300 cc. of 50 per cent aqueous potassium hydroxide solution is added, and the mixture is refluxed for five hours. The cooled solution is then acidified with concentrated hydrochloric acid and extracted with ethyl acetate. The ethyl acetate extract is concentrated in vacuo, and the crude oily reaction product is used for the next step. The product can be recrystallized from a mixture of acetone, ether and petrol-ether, and forms prisms melting at 133–137° C. with decomposition. $[\alpha]_D^{25}=+4.4°$. (c=1.2 per cent in 0.1 N sodium hydroxide.)

d-Dibenzyl-biotin 600 cc. of xylene are added to the crude oily d-3,4-(1′,3′-dibenzyl-2′-keto-imidazolido)-2-(ω,ω-dicarboxy-butyl)-thiophane (33–34 grams) obtained as described above. The mixture is refluxed until the initially undissolved product is completely decarboxylated and the dibenzyl-biotin formed is completely dissolved (10–20 minutes). The solution is then heated for another 20 minutes, during which time about 200 cc. of the solvent is distilled off. The rest of the solvent is removed by vacuum distillation. The oily residue consists of crude d-benzyl-biotin and is used for the next step without further purification. The product is very difficult to crystallize. The crude material shows a positive specific rotation.

l-Monobenzyl-biotin

About 5 grams of crude oily d-dibenzyl-biotin are dissolved in 30 cc. dry ethylene glycol diethyl ether (purified by fractionation, followed by refluxing over sodium for five hours and distilling onto fresh sodium). This solution is introduced rapidly with stirring into 100 cc. of liquid ammonia cooled in a dry ice bath. To the clear or slightly turbid solution are added in portions, 0.8 gram of sodium. The addition of the sodium is stopped, even before the whole amount has been introduced, if a persistent blue color appears. A slight excess of sodium (blue color), if present, is destroyed with some ammonium chloride, and the ammonia is evaporated. Water and hydrochloric acid are added to the remaining mixture. The mixture is cooled and the precipitated l-monobenzyl-biotin is filtered off.

After recrystallization from dioxane, the compound forms prisms melting at 181–182° C. and showing a specific rotation $[\alpha]_D^{25}$ of $-108.1°\pm1°$. (1 per cent solution in 0.1 N sodium hydroxide.)

We claim:

1. A 3,4-(2′-keto-imidazolido)-2-(ω-hydroxypentyl)-thiophane which can be represented by the following formula:

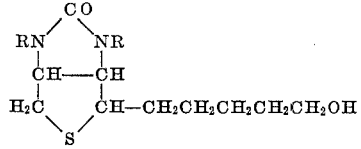

where R is a member of the group consisting of hydrogen and benzyl.

2. 1′,3′-dibenzyl-3,4-(2′-keto-imidazolido)-2-(ω-hydroxypentyl)-thiophane.

3. N-monobenzyl-3,4-(2′-keto-imidazolido)-2-(ω-hydroxypentyl)-thiophane.

4. 3,4-(2′-keto-imidazolido)-2-(ω-hydroxypentyl)-thiophane.

5. d-Biotinol.

6. The process which comprises reducing a 3,4-(2′-keto-imidazolido)-2-(ω-substituted-butyl)-thiophane of the following formula:

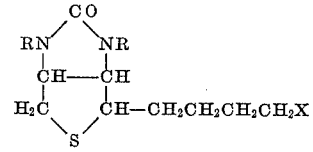

to form a 3,4-(2′-keto-imidazolido)-2-(ω-hydroxypentyl)-thiophane of the following formula:

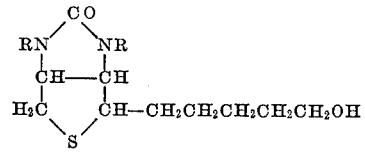

wherein R is a member of the group consisting of hydrogen and benzyl, and X stands for a radical convertible to —CH₂OH by reduction selected from the group consisting of a carboxy, a lower carbalkoxy and a carbonyl halide radical.

7. The process which comprises reducing

N-monobenzyl-3,4-(2′-keto-imidazolido)-
   2-(CH₂CH₂CH₂CH₂X)-thiophane where X stands for a radical reducible to

—CH₂OH selected from the group consisting of a carboxy, a lower carbalkoxy and a carbonyl halide radical, to form N-monobenzyl-biotinol.

8. The process which comprises reducing

N-monobenzyl-3,4-(2′-keto-imidazolido)-
   2-(CH₂CH₂CH₂CH₂X)-thiophane where X stands for a radical reducible to

—CH₂OH selected from the group consisting of a carboxy, a lower carbalkoxy and a carbonyl halide radical, to form N-monobenzyl-biotinol, and debenzylating the N-monobenzyl-biotinol to form biotinol.

9. The process which comprises reducing N-monobenzyl-biotin to N-monobenzyl-biotinol and debenzylating the last-mentioned compound to form biotinol.

10. The process which comprises debenzylating N-monobenzyl-biotinol to form biotinol.

11. The process which comprises reducing biotin to biotinol.

12. The process which comprises reducing biotin to biotinol in the presence of lithium aluminum hydride.

13. The process which comprises reducing a lower alkyl ester of biotin to biotinol in the presence of lithium aluminum hydride.

14. The process which comprises reducing the methyl ester of d-biotin in the presence of lithium aluminum hydride to form d-biotinol.

MOSES WOLF GOLDBERG.
LEO HENRYK STERNBACH.

No references cited.